May 12, 1959 R. L. PHELAN 2,886,314
SHEET STACK ALIGNING MECHANISM
Filed May 20, 1957 7 Sheets-Sheet 1

Fig. 1.

INVENTOR.
ROY L. PHELAN
BY
JP Santo
ATTORNEY

Fig. 3.

INVENTOR.
ROY L. PHELAN
BY
J.P.Santo
ATTORNEY

May 12, 1959 R. L. PHELAN 2,886,314
SHEET STACK ALIGNING MECHANISM
Filed May 20, 1957 7 Sheets-Sheet 5

INVENTOR.
ROY L. PHELAN
BY
JP Santo
ATTORNEY

May 12, 1959  R. L. PHELAN  2,886,314
SHEET STACK ALIGNING MECHANISM
Filed May 20, 1957 7 Sheets-Sheet 6

INVENTOR.
ROY L. PHELAN.
BY
*JPSanto*
ATTORNEY

May 12, 1959

R. L. PHELAN 2,886,314

SHEET STACK ALIGNING MECHANISM

Filed May 20, 1957

INVENTOR.
ROY L. PHELAN
BY
J P Santo
ATTORNEY

United States Patent Office 2,886,314
Patented May 12, 1959

2,886,314

SHEET STACK ALIGNING MECHANISM

Roy L. Phelan, Phoenixville, Pa., assignor to Burroughs Corporation, Detroit, Mich., a corporation of Michigan Application May 20, 1957, Serial No. 660,231

7 Claims. (Cl. 271—62)

This invention relates generally to improvements in form handling devices for presenting a stack of forms to a sheet separating and feeding apparatus.

More particularly, the invention relates to mechanism for compensating for a difference in height or thickness between two sides of an unbalanced stack of forms and maintaining the front or outermost form substantially flat or in side to side positional alignment with respect to the sheet separating plane of the feeding apparatus to which the stack is presented.

The invention is illustrated in a sheet separating and feeding apparatus having a vertically movable pack advancer, a suction operated sheet separating device, and a sheet feeding device which conveys and advances separated sheets past a work rendering or reading station to a sheet receiving station. The pack advancer presents a stack of forms to the sheet separator and maintains the top of the stack at a predetermined position where the sheet separator may contact and remove a sheet from the top of the stack and deliver it to the feeder apparatus. In order to assure proper operation of the sheet separator and to provide proper side to side alignment of each sheet conveyed through the feeder apparatus, it is essential that the top or front of the stack contacted by the sheet separator be substantially flat and parallel or coincident with the sheet pickup plane of the separating apparatus.

The invention is especially suited to handling of work or business forms which are of thicker dimension on one side or edge than along the opposite side or edge thereof and is illustrated for use with bank statement ledger cards of the type having a longitudinally extending strip of magnetic tape or material placed on the back of the forms near one side thereof. The addition of the magnetic stripping material will increase the thickness of the individual forms along one side thereof and will result in an unbalance or displacement in the height or thickness of the two sides of a stack of such forms.

If a stack of such forms or sheets is presented to a sheet separating and feeding apparatus of the above character, the top of the stack will be inclined to the sheet separating or feeding plane thereof. The sheet separator therefore will not make proper contact with the top of the stack, resulting in a condition where the front edge of the sheet may not be evenly delivered to the feeder and the sheet may not be delivered in proper side to side alignment through the feeding apparatus. As more of such sheets are added to the stack, the angle of displacement between the top of the stack and the plane of the sheet separator further increases, and eventually the separator will entirely fail to operate and pick up a sheet from the stack.

Accordingly, the present invention has for its general object to provide improvements in form handling devices for sheet separating and feeding apparatus of the above character.

More particularly, the invention seeks to provide a compensating mechanism for maintaining the top or outermost sheet of a stack of sheets in perfectly flat and coinciding side to side alignment with the sheet separating plane of the sheet separating and feeding apparatus to which the stack is presented irrespective of a difference in thickness between the sides of the individual sheets and the sides of the stack.

A specific object is to provide a sheet stack height or thickness compensating mechanism which continuously and automatically adjusts the amount of compensation required to maintain the top or front of an unbalanced stack of sheets in a predetermined position as the size of the stack diminishes.

The manner in which the above and other objects of the invention are accomplished, together with the features and advantages thereof, will appear more fully from the following detailed description and drawings in which:

Figure 1:
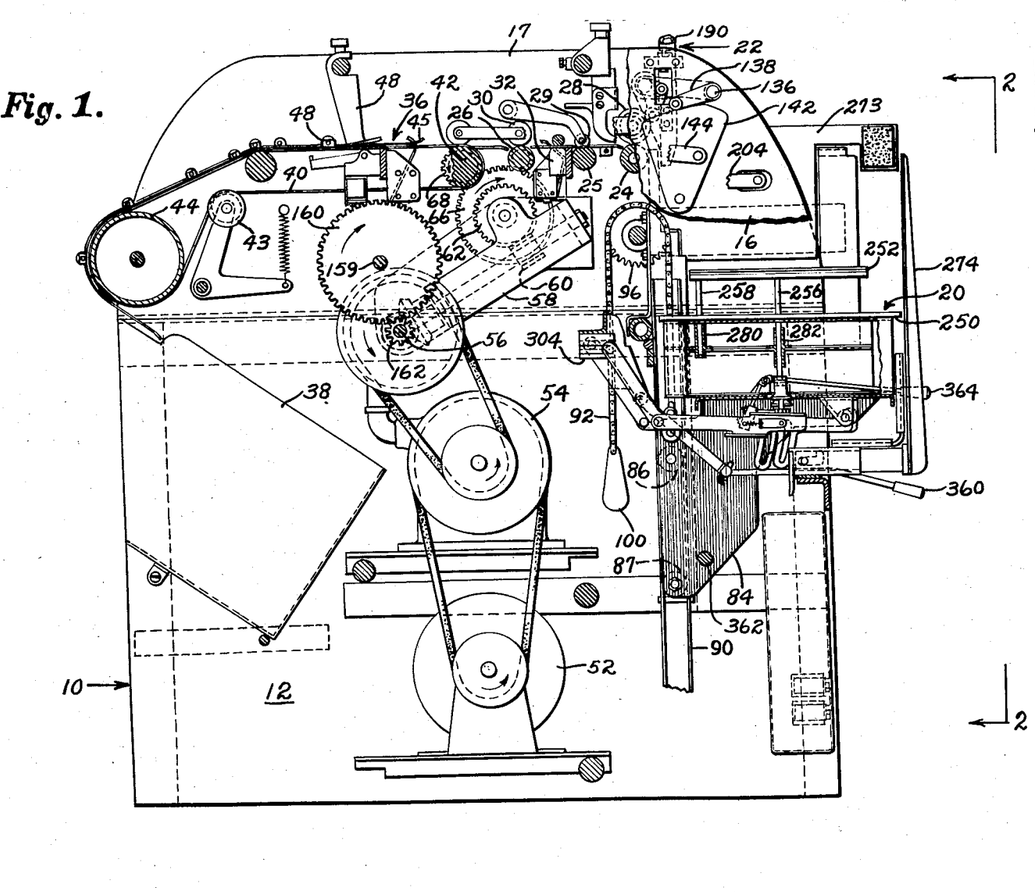
Fig. 1 is a side elevation view with parts broken away of a sheet separating and feeding apparatus having a pack advancer which incorporates the sheet stack height compensating mechanism of the present invention.
Figure 2:
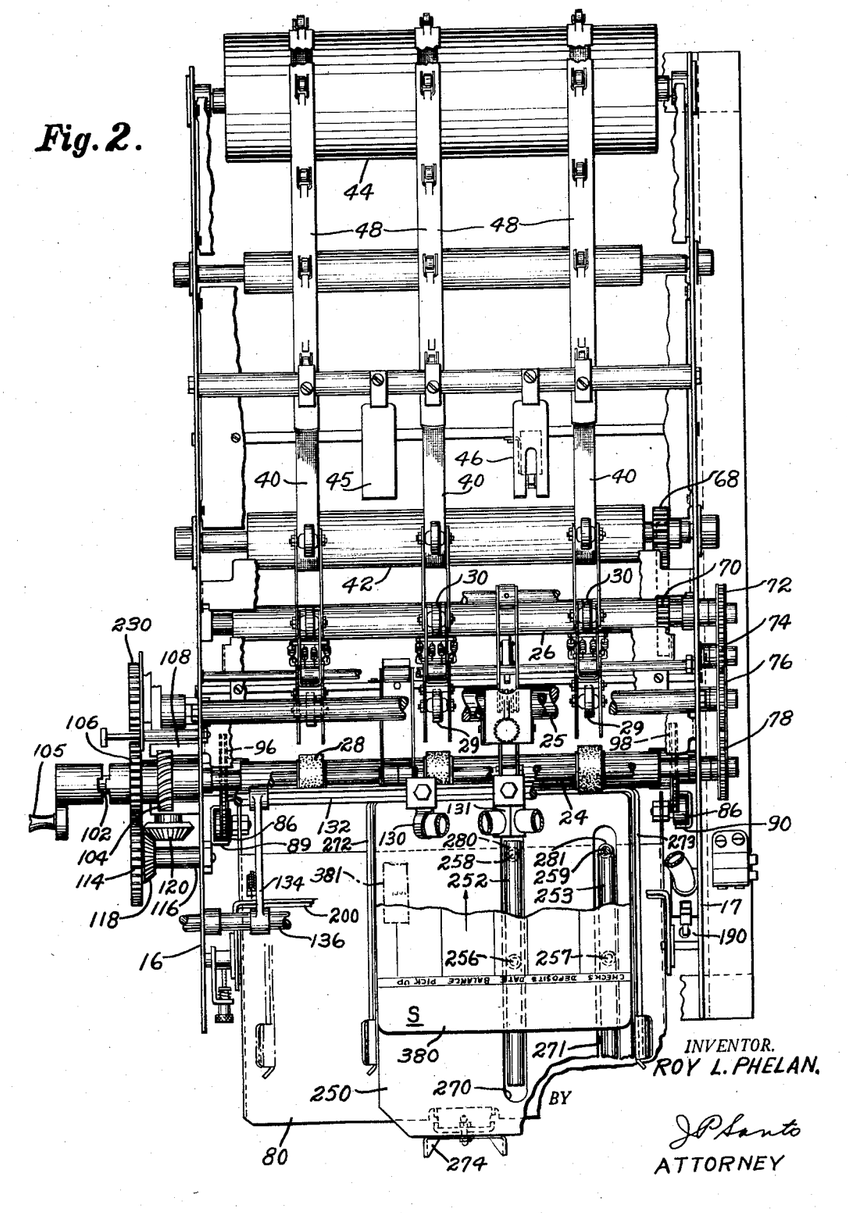
Fig. 2 is a top plan view with parts broken away of the sheet separator and feeder apparatus of Fig. 1.

Referring to the drawings, Figs. 1 and 2 illustrate a sheet separating and feeding apparatus which will be recognized as including the Model 195 Suction Feeder and associated sheet advancing apparatus manufactured by the Addressograph-Multigraph Corporation of Cleveland, Ohio, various parts of which are shown in the following U.S. Patents: 2,293,046; 2,358,560; 2,359,850; and 2,561,030.

The apparatus includes, in general, a box-like frame 10, which is enclosed by a cabinet 12 and mounts an upright pair of laterally spaced, longitudinally extending side plates 16 and 17. Mounted on the right hand side of the cabinet is a vertically movable pack advancer or sheet stacker indicated generally at 20 which supports and presents a stack of magnetically striped work sheets, indicated at S in Fig. 4, to a suction type sheet separating device indicated generally at 22. The sheet separating device separates and removes the top sheet from the pile and delivers it to a succession of longitudinally spaced, stainless steel lower feed rolls 24, 25, and 26 which extend transversely between and are journaled in the side plates and are associated with separate upper feed, rubber idler rolls 28, 29, and 30, respectively, as indicated.

The sheet is conveyed past a magnetic reading head 32 to a sheet conveyor or advancing apparatus indicated at 36. The magnetic reading head forms part of an automatic reader system disclosed in applicant's co-pending U.S. patent application S.N. 685,197, filed September 20, 1957, of common ownership herewith. The sheet advancer delivers the sheets in the same order in which they were separated to an adjustable form receiving, reverse stacker chute 38 at the left end of the machine by means of a system of endless fabric belts or tapes 40, which encircle a tape drive roll 42 and a reversing roll 44 journaled in the side plates and are tensioned by spring loaded idler rolls, as 43. The sheets are gripped in operative frictional engagement with at least one of the belts by means of an arrangement of hold-down guides 45, 46 and roller skid bars 48 in the manner of the sheet advancing mechanism illustrated in U. S. Patent 2,561,030.

The feed rolls of the sheet feeding mechanism and the tape drive roll of the sheet advancing means 36 are continuously driven from a drive motor 52, which is mounted on the frame of the machine as indicated and drives a vacuum pump 54, a main drive shaft 56, and a power transmission 58 through an arrangement of associated belts, pulleys and gearing. Power is supplied from the output of the transmission 58 through a pinion 60 meshing with a spur gear 62, to a ring gear 66, which is secured to the shaft of the spur gear and drives a pair of pinions 68 and 70 illustrated in Fig. 2. Pinions 68 and 70 are drivingly secured to the shaft of the tape drive roller 42 and to the shaft of the lower feed roll 26, respectively. Feed roll 26 mounts a sprocket wheel 72 on the outboard end thereof adjacent plate 17 and drives the lower feed rolls 25 and 24 through a chain belt 74 linking sprocket wheel 72 and a pair of sprocket wheels 76 and 78, which are secured on the outboard ends of the feed rolls 25 and 24, respectively.

Figure 3:
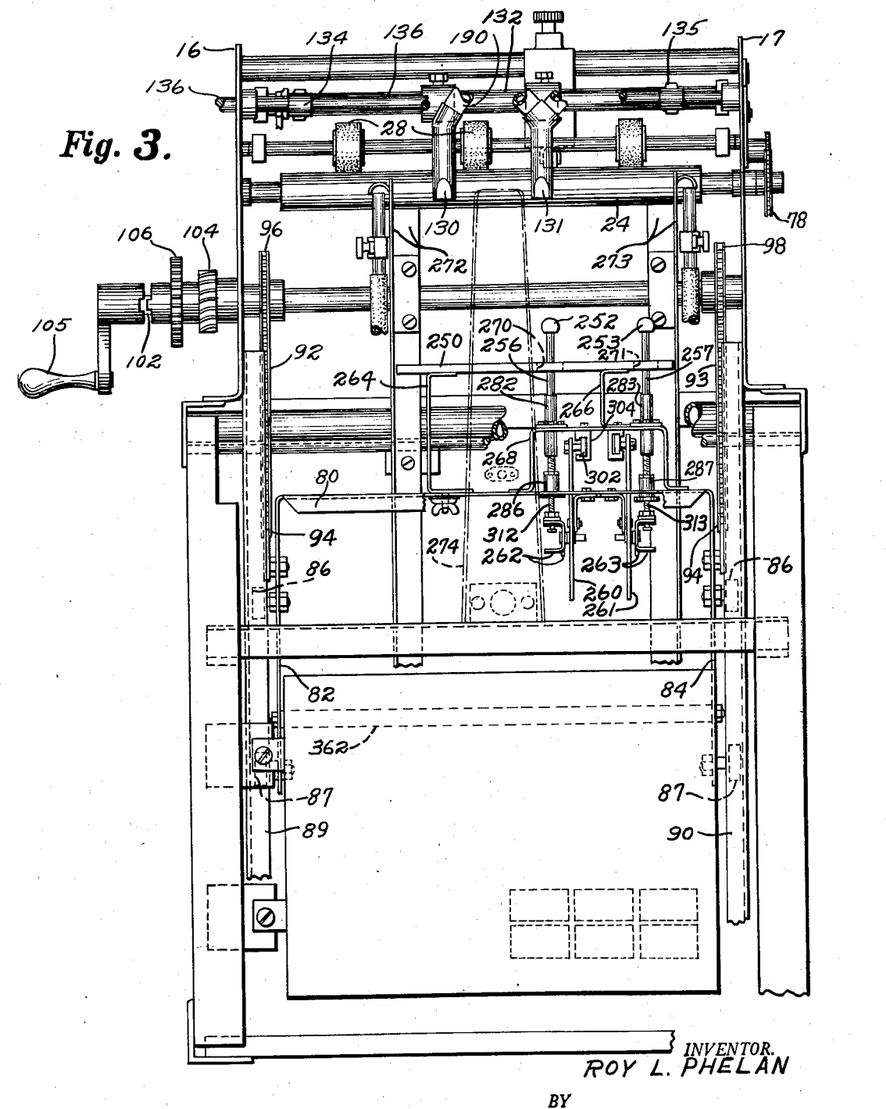
Fig. 3 is an end view with parts broken away taken in the direction 2—2 of Fig. 1.
Figures 4, 5:
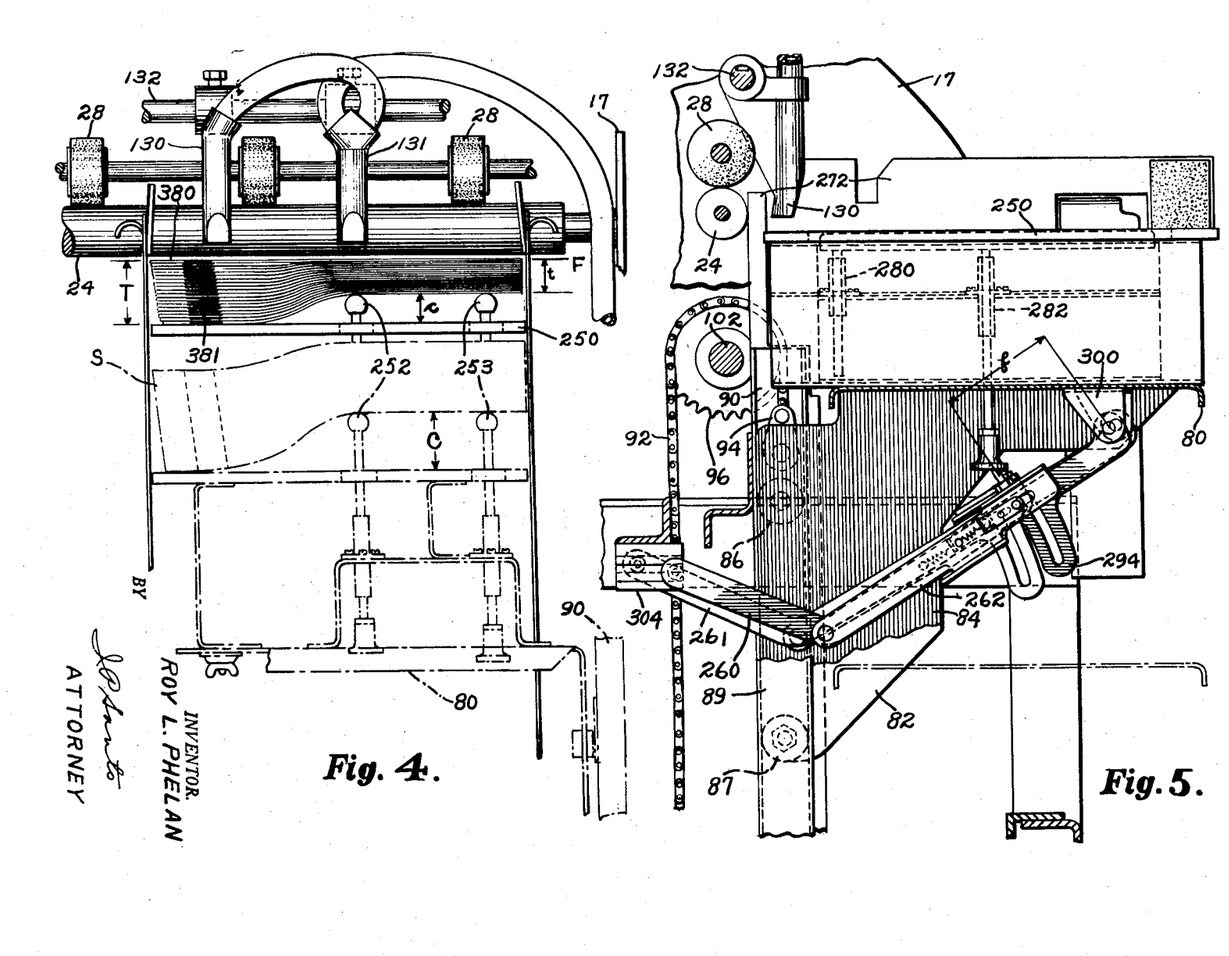
Fig. 4 is a fragmentary end view showing some of the components of the compensating mechanism in an intermediate position and in the retracted position of the pack advancer included in the apparatus of Fig. 1.
Fig. 5 is an enlarged, fragmentary side elevation view showing the compensating mechanism of the present invention in the fully advanced or raised position of the pack advancer.

The pack advancer 20 is generally similar to that shown in U.S. Patent 2,358,560 and, as illustrated in Figs. 3 and 4 herein, includes a horizontally disposed feed hopper 80 having a pair of laterally spaced, depending side flanges 82 and 84, each of which carries a pair of vertically spaced rollers 86 and 87. The rollers project outwardly from the side flanges and engage the flanges of a pair of vertically extending guide track channels 89 and 90, which are fixed to the frame 10 and guide the hopper for vertical movement. The hopper is supported by a pair of chains 92, 93 which are attached to the respective side flanges as at 94. Each of the chains extends upward and around a different one of a pair of laterally spaced sprocket wheels 96, 98, and has a counter-weight, one of which is shown at 100 in Fig. 1 herein, secured to its depending free end. The sprocket wheels are secured to a cross shaft 102, which is journaled in the side plates 16, 17 and has a worm gear 104, a lift crank handle 105, and an idler gear 106 on the outboard end thereof adjacent side plate 16.

Figure 6:
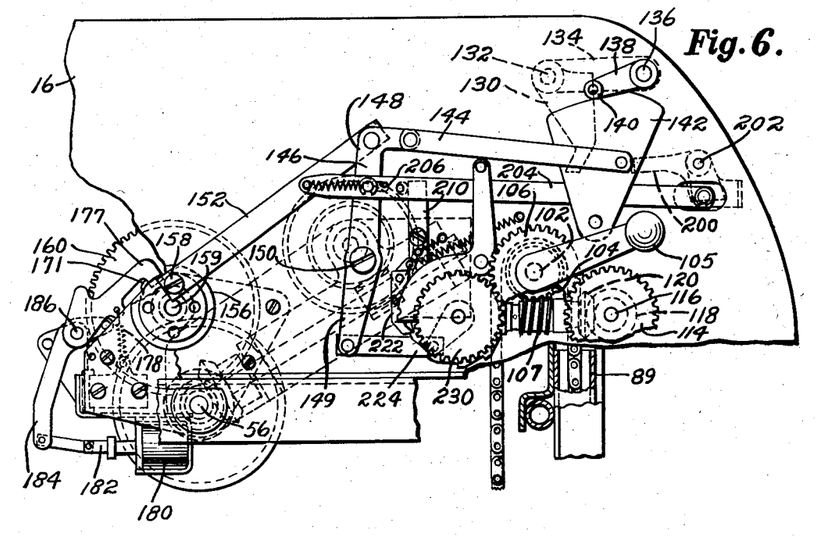
Fig. 6 is a fragmentary side elevation view of some of the components controlling the operation of the pack advancer and the sheet separator of the apparatus of Fig. 1.

Referring to Figs. 2 and 6, gear 104 is secured to shaft 102 and meshes with a worm 107 supported in a bearing bracket 108 on side plate 16. The manually operated crank handle 105 is rotatably mounted on the end of shaft 102 and is axially slidable thereon to permit it to be brought into clutching engagement with the hub of the idler gear 106 rotatably mounted on shaft 102. Idler 106 meshes with a gear 114, which is rotatably mounted on a stub shaft 116 secured to side plate 16 and has a bevel pinion 118 secured to the back face thereof. Pinion 118 meshes with a similar bevel pinion 120 which is drivingly secured to the shaft of the worm 106 to drive worm gear 104 and shaft 102, thereby raising or lowering the feed hopper, upon rotation of the crankhandle 105.

Figure 10:
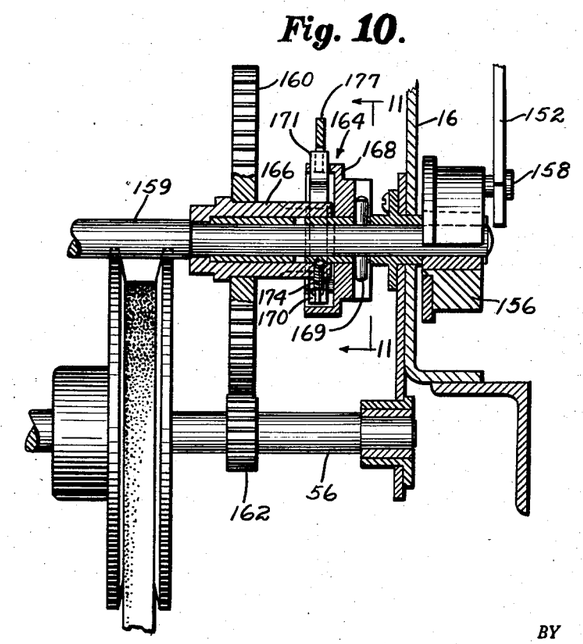
Figs. 10 and 11 illustrate the components of a one-revolution clutch through which power is applied to operate the sheet separating apparatus and pack advancing mechanism employed in the apparatus of Fig. 1.

The sheet separating mechanism 22 may be of the suction pick-up type shown in U.S. Patents 2,293,046 and 2,561,030. As indicated in Figs. 1, 3 and 6 herein, the sheet separating mechanism includes, in general, a pair of laterally spaced suction feet 130, 131 adjustably secured to a slotted rod or shaft 132 which is supported near its ends by a pair of spaced crank arms 134, 135. The crank arms are secured to a cross shaft 136, which is journaled in the side plates 16 and 17 and extends outwardly through the left side plate 16. Secured to the outboard end of shaft 136 is a lever 138 which carries a roller 140 thereon. Roller 140 coacts with a cam 142, which is pivotally mounted on side plate 16 and is connected by an operating link 144 to the upper arm 148 of a bell crank lever 146 that is pivoted on the side plate 16 as at 150. The upper arm 148 of the bell crank 146 is pivotally coupled to one end of a drive link 152. The other end of the drive link is pivotally coupled to a drive collar 156 through a pin 158, which is carried by and is positioned eccentrically of the collar, as illustrated in Fig. 10. Collar 156 is secured to the outboard end of a cross shaft 159 which is journaled in the side plates 16 and 17 and has a spur gear 160 rotatably mounted thereon inwardly of plate 16. Gear 160 is continuously driven by a pinion 162 secured to the main drive shaft 56 of the machine as indicated in Figs. 1 and 10, and is adapted to be connected to the shaft 159 to impart rotative movement thereto by a solenoid actuated, one-revolution clutch, indicated at 164.

Figure 11:
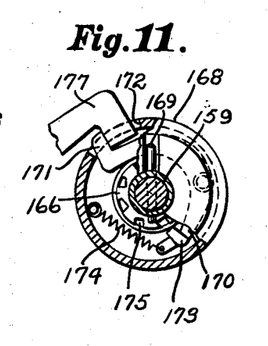

The clutch 164 is similar to the form of one-revolution clutch more fully described in U.S. Patent 2,359,850 and, as shown in Figs. 10 and 11 herein, includes a driven sleeve member 166 and a cup-shaped member 168 which is pinned to shaft 159 by a pin 169 and carries a releasable clutch pawl 170 adapted to engage the driven member. Sleeve member 166 is free to rotate on the shaft 159, which passes centrally therethrough, and is drivingly secured to the continuously driven gear 160, as indicated. One end 171 of the clutch pawl projects through an opening 172 in the cup-shaped member 168 and its other end carries a projection 173 which is urged by a spring 174 into engagement with any one of several peripherally spaced notches 175 on the driving sleeve member 166. Rotation of the engageable member 168 and shaft 159 is terminated by a clutch stop or disengaging lever 177, which is normaly urged by a spring 178 into active engagement with the projecting end 171 of the clutch pawl 170, as indicated in Fig. 6.

The one-revolution cycle is initiated by momentary withdrawal of the stop lever 177 upon energization of a solenoid 180, the plunger 182 of which is coupled to one end of a bell crank 184 which is fixed to a rock shaft 186 journaled in the side plate 16, as indicated in Fig. 6. Rock shaft 186 is secured to one end of the stop lever 177 and raises the other end of the stop lever out of engagement with the projecting end of the clutch pawl 170 to cause the one-revolution clutch 164 to engage and rotate shaft 159 and collar 156, thereby rocking the bell crank lever 146 through link 152.

Rocking of the lever 146 rocks cam 142 through link 144 and oscillates the shaft 136 through roller arm 138. This action imparts a rocking movement to the shaft 132 to first lower and then raise the suction feet 130, 131 and then swing them in a clockwise direction, thereby to move a sheet from the top of the stack into the bite of the front feed rolls 24, 28, as more fully shown and explained in connection with the Fig. 8 of U.S. Patent 2,561,030. Suction is supplied to the sheet pickup feet from the vacuum pump 54 through a control valve 190 (Fig. 2) which is opened and closed in timed relation with the movement of the suction feet as described in connection with Figs. 9 and 10 of the above patent.

In order to maintain the top of the stack at a predetermined elevation as successive sheets are withdrawn therefrom, the pack advancer is adapted to be raised from time to time by means of a stack height sensing mechanism. This mechanism controls the operation of a pack advancing mechanism through which power is applied from the lower end of the bell crank lever 146 in order to impart a rotative advancing movement to the cross shaft 102. The height sensing and pack advancing mechanism is similar to that shown in U.S. Patent 2,358,560 and includes a transversely extending bail 200, which is freely mounted on a rod 202 extending between the side plates and is pivotally coupled to the right hand end of a bar 204. Bar 204 is located outwardly of plate 16 and is coupled to the bell crank lever 146 by a pin and slot connection indicated at 206. As the height of the stack falls below a predetermined height or level, the bail 200, extending transversely across and resting on the top of the stack, moves downward to pull bar 204 to the right until a pin 208, which is located intermediate the ends of the bar, engages the upper end of a latch 210 that is pivoted to the side plate 16.

Figure 7:
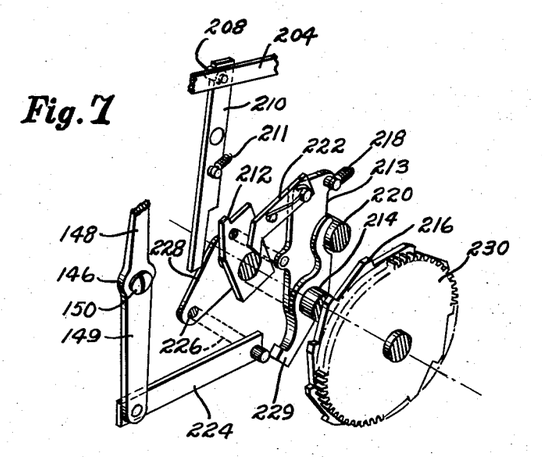
Fig. 7 is an exploded perspective view of a latching mechanism controlling the automatic operation of the pack advancer.
Figure 8:
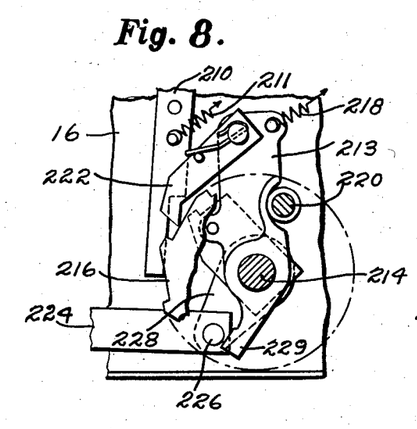
Figs. 8 and 9 are additional views illustrating the operation of the pack advancing control mechanism of Fig. 7.

As indicated in Fig. 7, movement of the bar 204 to the right swings latch 210 in a clockwise direction against the action of a spring 211 and draws the lower end of the latch out of engagement with an abutment 212 pinned to a pawl carrier 213. The pawl carrier is pivotally mounted on a shaft 214 having a ratchet wheel 216 rotatably mounted thereon. The withdrawal of the latch 210 from the abutment 212 permits a spring 218 to rock the pawl carrier 213 about the ratchet wheel shaft 214 in a clockwise direction from the position shown in Fig. 9 to that indicated in Fig. 8 into contact with a fixed stop 220. In this position, a pawl 222, pivotally connected to the carrier 213, engages the ratchet wheel 216 and is in position to impart an advancing movement to the wheel upon a counterclockwise movement of the pawl carrier. The ratchet wheel 216 is advanced by movement of the bell crank lever 146, the lower arm 149 of which is pivotally coupled to one end of a link 224. The other end of this link is pivotally coupled by a pin 226 to one end of a supporting lever 228 mounted freely on shaft 214.

Figure 9:
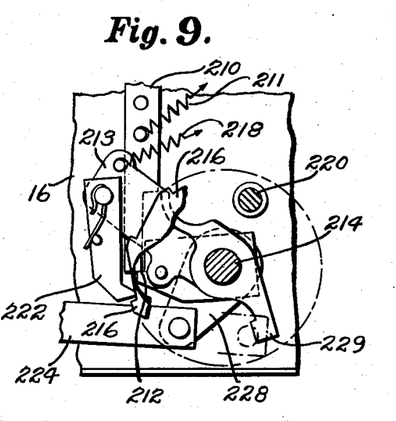

The rocking of the crank 146, as described hereinabove, moves link 224 to the right to cause the projecting end of pin 226 to engage the foot 229 of the pawl carrier 213, thereby swinging the carrier to the position shown in Fig. 9 when the pawl 222 advances the ratchet wheel 216 a distance of one tooth. Secured to the ratchet wheel 216 is a gear 230, which meshes with the idler gear 106 of Fig. 6 on the cross shaft 102 of the pack advancing mechanism and raises the feed hopper upon rotative movement thereof.

As long as the top of the stack of sheets in the feed hopper remains below the desired elevation, the latch 210 will be retained in its unlatched position and the ratchet wheel operating mechanism will continue to function in repeating cycles of operation upon application of power thereto through clutch 164 each time solenoid 180 is energized. When the stack reaches the desired elevation, the spring 211 will draw the latch into a latching position where it will re-engage the abutment 212 and stop the pawl carrier in the position shown in Fig. 9 and prevent rotation of the ratchet wheel 216.

The above described sheet separating and feeding apparatus operates satisfactorily to separate and deliver sheets from a flat stack of sheets of uniform thickness in the feed hopper. Where an unbalanced stack of workpieces or sheets which are of greater thickness along one side or edge than along the other side or edge thereof is placed in the feed hopper, the top of the stack will be inclined to the sheet separating plane of the feeder. As mentioned earlier herein, this condition can cause uneven front edge delivery, misalignment of and possible jamming of forms conveyed through the feeder, or otherwise render the apparatus inoperative. The compensating mechanism of the present invention obviates this condition and maintains the top, front or outermost form of the stack in a flat, level position irrespective of a difference in the height or thickness of the two sides of the stack and of the size of the stack.

With reference to Figs. 2, 3, 12 and 13, the compensating mechanism of the present invention comprises a horizontally disposed paper base plate or table 250 supported from and moved with the feed hopper 80 and an auxiliary supporting means which is differentially movable relative to the base plate by a system of linkages. The auxiliary support means includes a pair of longitudinally extending paper support or compensating bars 252 and 253, a pair of vertically extending lift rods 256 and 257, and a pair of vertical guide rods 258 and 259 (Fig. 2). The linkage system includes a pair of cam levers 260 and 261, each of which mounts a lowering arm 262 and 263 and has a portion pivotally secured to the hopper and another portion that is guided for limited horizontal movement in a stationary part of the machine.

As indicated in Figs. 2 and 3, the base plate 250 is supported along one side by a longitudinally extending channel 264 attached to the hopper and along its other side by a smaller channel 266 affixed to the plate and to an inverted channel 268 secured to the hopper. The plate is provided with a pair of longitudinally extending slots 270, 271 to permit passage of the support bars 252 and 253 therethrough, and is adapted to receive a stack of forms S, the corners at the leading edge of which seat in the flanges of a pair of laterally spaced, vertically extending guides 272 and 273 which are adjustable transversely of the feeder. The other edge of the form stack is guided by a vertically extending, longitudinally adjustable guide 274 supported from the frame of the machine as indicated in Fig. 1.

The guide rods 258, 259 (Figs. 1 and 2) are affixed to one end of respective ones of the support bars and pass slidably through individual guide tubes 280, 281, secured to the inverted support channel. The lift rods 256 and 257 are affixed to and are located intermediate the ends of respectively different ones of the support bars and are guidingly received in individual guide tubes 282, 283 also secured to the inverted support channel. The lowermost end of each lift rod is threaded to receive a lift base 286, 287 which passes through an opening in the horizontally disposed portion of the hopper and is adapted to be contacted by a part of the compensating linkage.

Figure 12:
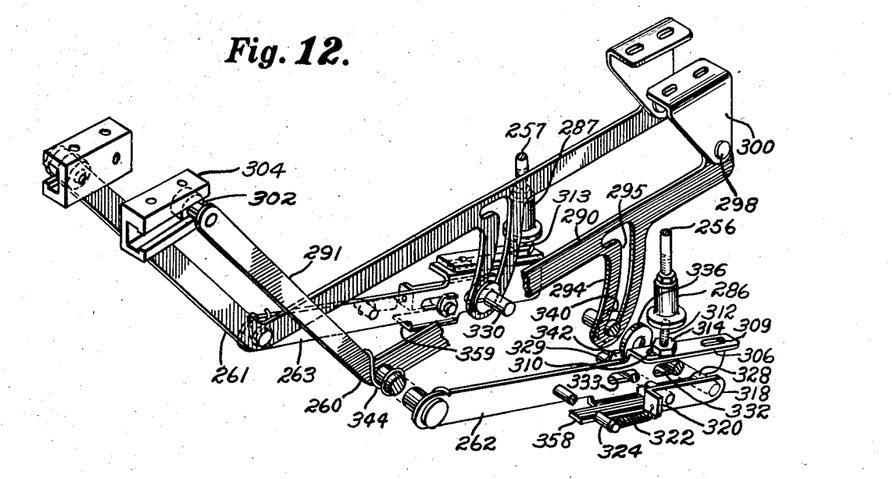
Fig. 12 is a perspective view of the compensating linkages employed in the compensating mechanism of the present invention.
Figure 13:
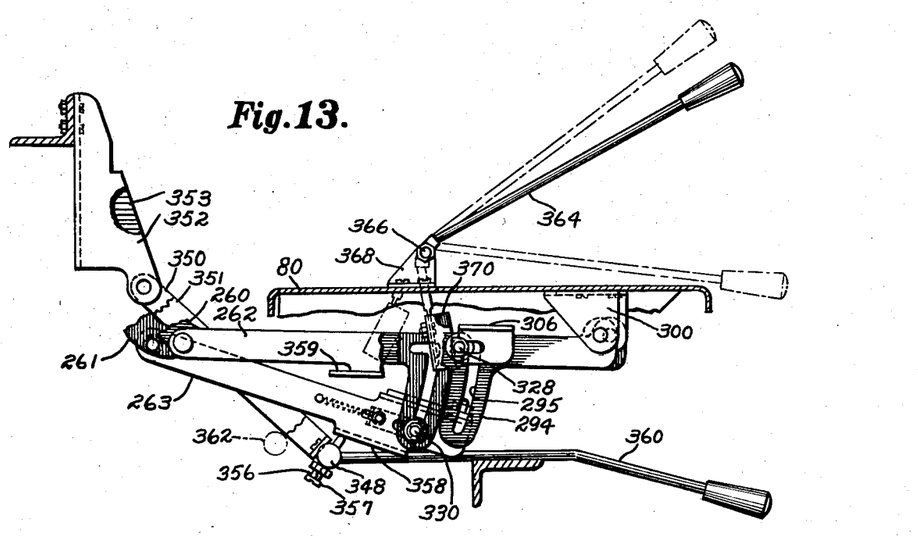
Fig. 13 is a fragmentary side elevation view with parts broken away showing mechanism for enabling and disabling the operation of the compensating mechanism of the present invention.

For the sake of clarity of description, only the compensating linkage including cam lever 260 and lowering arm 262 associated with support bar 252 will be described. With reference to Figs. 12 and 13, the cam lever 260 has a pair of inclined arm portions 290, 291, the longer arm 290 of which has a depending arcuate portion 294 with a generally L-shaped slot 295 therein. One end of the longer arm 290 of the cam lever is pivotally mounted as at 298, to a bracket 300, secured to the underside of the feed hopper. The opposite end of the shorter arm 291 mounts a roller 302, which is guided in a grooved slide block 304 fastened to the frame of the machine, as indicated. The lowering arm 262 is pivotally mounted at one end to its associated cam lever 260 and has a laterally extending flange portion 306 on its upper edge near the other end thereof. The flanged portion 306 of the lowering arm is provided with a pair of longitudinally spaced elongated slots 309, 310, one of which receives a threaded machine screw 312. The machine screw is fastened to the flange by a nut 314 and has a rounded head that is adapted to be brought into contact with the lower end of the lift base 286 on the lift rod 256 associated therewith.

The lowering arm is adapted to be brought into contacting relation with or disengaged from the lift rod by means of a latching device which includes a latch element 318 having an offset end portion 320 that is fastened by a spring 322 to a stud 324 carried by the lowering arm. The latch element 318 carries a longitudinally spaced pair of laterally extending studs 328, 329 which extend through respective ones of a pair of elongated slots 332, 333 in the lowering arm. As viewed in Fig. 12, the longer stud 328 extends through the forwardly located slot 332, a spacer 336 located between the lowering arm and the depending portion 294 of the cam lever, and the slotted depending portion of the cam lever and is secured against withdrawal therefrom by a slotted fastener 34 received on an annular grooved portion of the stud. A similar fastener element 342 is provided on the shorter stud 329 of the latch extending through the rearwardly located slot 333 in the lowering arm. A torsion spring 344 coupled to the cam lever 260 and lowering arm 262 normally maintains the latter arm in its lowered position with the stud 328 bottomed against the lower end of the curved section of the slot 295 in the depending portion 294 of the cam lever, as indicated.

The lowering arms 262, 263 of the cam levers are adapted to be raised simultaneously from their lowered position by means of a raising assembly from the position shown in Fig. 12 into an upper or latching position of Figs. 1 and 5 where the contacting screws carried by each of the lowering arms may contact the lift base of an associated lift rod. As indicated in Fig. 13, this assembly includes a transversely extending bail rod 348, which is swingably supported from and is pivotally connected by a pair of spaced links 350, 351 to a pair of spaced brackets 352, 353 fastened to the frame of the machine. Secured to and extending through the bail rod 348 is a laterally spaced pair of screws 356, 357 each of which has a rounded end that is adapted to be brought into contacting relation with an outwardly turned flange 358, 359 provided on the lower edge of respective ones of the lowering arms 262 and 263, as indicated. A manually operable lever 360, accessible from the front of the feed hopper, is secured to the bail rod 348 and may be raised from a position in which the bail links 350, 351 rest against a tie rod 362, which extends between the depending flanges of the hopper, to bring the rounded end of the screws 356, 357 into contact with the lower flanged portion of each of the lowering arms. The lowering arms thus may be raised from their unlatched or inactive lower position to position the forwardly located stud of the latching assembly carried by each of the lowering arms against the left end of the upper section of the slot in the depending portion of respective ones of the cam levers.

The lowering arms may be unlatched or disengaged from their cam levers to inactivate the compensating mechanism by means of a manually operated trip lever 364 which is pivotally mounted on a stud 366 on an upwardly extending bracket 368 secured to the feed hopper as shown in Fig. 13. The lower end of the trip lever mounts a trip channel 370, the spaced side flanges of which are adapted to contact the end of each of the latching studs 328, 330, projecting through the cam levers. Raising of the trip lever 364 causes the trip channel to move the latch studs out of the upper end of the slot in the depending portion of each of the cam levers to a position where the torsion spring associated with each cam lever and lowering arm drops the lowering arm into the lower end of the slot in the depending portion of its cam lever.

The operation of the compensating mechanism may be understood from Figs. 1, 4, and 5. In the absence of the compensating mechanism, the stack of unbalanced sheets would rest on the feed hopper or base plate with the back of the stack in a flat, level position and the top of the stack angularly displaced from or inclined to the horizontal. As indicated in Fig. 4, the compensating mechanism of the present invention reverses this condition by raising and displacing a portion of the bottom of the stack adjacent the thinner side thereof by an amount corresponding to the difference in thickness between the sides of the stack and continuously adjusts the required amount of compensation in accordance with the reduction in the size of the stack in order to maintain the top of the stack in a level, horizontal position.

With the hopper in its lower retracted position indicated by the dash-dot lines and the lowering arms latched in their upper or raised position to their respective cam levers, the compensating support bars 252 and 253 are in their fully extended position relative to the paper base plate 250. A stack of forms S comprised of individual ledger sheets or cards 380, each having a strip of magnetic tape 381 on the back thereof, is placed in the hopper or stacker 80, preferably with the thinner side of the stack resting on the two support bars and the thicker part of the stack overhanging the support bars and resting on the support plate. As the hopper is elevated, either through the manually or automatically operated pack advancing mechanism previously described, the difference C between the top of the support bars and the base plate diminishes, so that when the top of the stack is presented to the feeding position F of the sheet separator and feeder apparatus, the elevation c of the compensating support bars above the base plate will be equal to the difference in the thickness T, t between the two sides of the stack, and the two sides of the top sheet will be at the same horizontal elevation above the base plate. The top or uppermost sheet will then be in a flat, horizontal position coincident with or parallel to the horizontal sheet pickup plane of the suction feet 130, 131 and both of the feet may make uniform contact with the flat, level surface of the sheet and deliver it evenly to the horizontally disposed feed rolls of the feeder apparatus.

The previously described stack height sensing mechanism including the bail 200 permits operation of the pack advancing mechanism when the stack height falls below a predetermined level at which the suction feet will no longer contact the top of stack and permits the hopper to be raised, thereby raising the base plate and compensating bars to maintain the top of the stack at the feeding position F. As the feed hopper 80 and the base plate 250 are raised, the cam lever swings in a generally clockwise direction with respect to its roller end or the feed hopper and lowers its associated lift rod with respect to the hopper. The distance between the top of the compensating support bars and the base plate, thus, diminishes at a constant rate corresponding to the difference in thickness between the sides of the sheets removed from the stack until the bars are retracted below the surface of the base plate as shown in Fig. 5.

Inasmuch as the base plate is supported on the feed hopper, the base plate 250 will be raised or lowered at the same rate of movement as the feed hopper 80, and since one end of each cam lever is pivotally secured to the hopper, that end of each cam lever will be raised or lowered similarly with the movement of the hopper. However, since the roller end of each of the cam levers is mounted in a grooved slide block on the frame of the machine, the roller end of each cam lever remains at a fixed elevation and is constrained against vertical movement so that it can move only longitudinally, slightly rearwardly and forwardly, in its slide block. The angle between the lowering arm carried by each cam lever and the vertical axis of the associated lift bar continually changes with vertical movement of the hopper and will be seen to cause a different and slower rate of movement of the lift rods relative to the base plate, with the result that the plate travel eventually overtakes the travel of the lift rods and the compensating bars. The rate of movement of the individual lift rods is a function of the distance f of the contacting screw carried by the lowering arm of its associated cam lever from the center of the pivotal connection of the cam lever to the feed hopper and will vary approximately in inverse manner as the ratio of this distance to the distance between the pivoted end and roller end of its cam lever increases.

The adjustment for a correct relative decrease in height of the lift rod for a given rise of the feed hopper is accomplished by longitudinally shifting the bracket mounting the pivoted end of a cam lever to the feed hopper. A shift inward toward the lift base will decrease the relative motion, while a shift outward and away from the base will increase the relative motion.

In some instances, it may be desired to provide a different rate of compensation or movement of the support bars 252, 253 relative to one another. This may be accomplished by locating one of the contacting screws at a different distance from the pivoted end of its associated cam lever than the corresponding distance between the other screw and the pivoted end of its cam lever. So that the compensating mechanism can be made to provide a greater range of variation of compensating rates for the two support bars, the cam levers may be made of different lengths as illustrated. In the present application of the invention, however, the compensating bars are at the same relative elevation and are caused to move at substantially the same rate by adjusting the heights of the contacting screws and locating the contacting screw 312 for the shorter cam lever 260 in the rearwardly located slot 310 of the upper flanged portion 306 of its lowering arm 262 and locating the contacting screw 313 associated with the longer cam lever 261 in the forwardly located slot of the upper flanged portion of lowering arm 263, as indicated in Fig. 12.

By reason of the elongated slots in the brackets mounting the pivoted ends of the cam levers, the brackets may also be adjusted longitudinally of the feed hopper to permit the lift rod adjusting contacting screws to contact and operate around the center point of the enlarged flat lower surface of their associated lift bases.

Where two compensating bars are employed and both are to have the same amount of differential movement relative to the base plate, the cam levers and associated mechanism of each of the compensating linkages can, of course, be identical.

In some applications, depending, for example, upon the location of the thinner section of the sheet or form, it may be found that only one compensating bar may be required. This may be accomplished herein by longitudinally displacing the latching studs 328 and 330 of the lowering arms 262 and 263, as by longitudinally displacing the cam levers, for example, so that the trip channel 370 of the trip lever 364 will engage one of the latching studs in advance of the other. Thus, with the configuration of cam levers illustrated in Fig. 13, the trip lever 364 may be raised to a position intermediate the two dotted positions shown to disengage the lowering arm 263 from the longer cam lever 261 and thereby inactivate or lower the compensating support bar 253 below the surface of the base plate without inactivating the centrally located support bar 252. Further upward movement of the trip lever disengages the lowering arm 262 and totally inactivates the entire compensating mechanism.

The disabling mechanism also may be used in the retracted position of the feed hopper to drop the lift rods and the compensating bars below the surface of the base plate to facilitate loading of a stack of forms in the stacker.

While the compensating mechanism of the present invention has been described for use with magnetically striped ledger cards, it is apparent that it may be used with other types of forms and documents such as envelopes and multiple sheet forms or invoices having a bound heading or fold at one side or edge thereof and with other types of work sheets or work pieces having sides or edges of different thicknesses.

What is claimed is:

1. In a form handling device for presenting the front or outermost form of a stack of sheets, cards and the like to a flat feeding position in a form feeding apparatus in which said forms are fed one at a time from said stack along a predetermined path, each of said forms being of greater thickness along one side than at the opposite side thereof, the combination of a supporting backing plate of relatively broad expanse and movable in a direction to present the outermost form to said feeding apparatus, auxiliary supporting means structurally separate from, movable relative to and positioned in advance of said plate in the direction of said feeding position and adapted to engage the thinner portion of said stack of forms with the thicker portion of the stack engaging said plate, and means for moving said plate and said auxiliary supporting means at different rates related to the different thicknesses of the sides of the stack to reduce the positional difference therebetween as the plate and auxiliary support means are advanced toward the feeding position.

2. In a form handling device for presenting the front or outermost form of a stack of sheets, cards and the like to a flat feeding position in a form feeding apparatus in which said forms are fed one at a time from said stack along a predetermined path, each of said forms being of greater thickness along one side than at the opposite side thereof, the combination of a supporting backing plate of relatively broad expanse and movable in a direction to present the outermost form to said feeding apparatus, auxiliary supporting means structurally separate from, movable relative to and positioned in advance of said plate in the direction of said feeding position and adapted to engage the thinner portion of said stack of forms with the thicker portion of the stack engaging said plate, means for moving said plate at a uniform rate and means responsive to movement of said plate for moving said auxiliary supporting means at a slower rate than the plate whereby the positional difference therebetween diminishes as the plate and auxiliary supporting means are advanced toward said feeding position until both are at substantially the same position.

3. In a form handling device for presenting the front or outermost form of a stack of sheets, cards and the like to a flat feeding position plane in a form feeding apparatus in which said forms are fed one at a time from said stack along a predetermined path, each of said forms being of greater thickness along one side than at the opposite side thereby unbalancing the sides of the stack and displacing the front or outermost surface thereof from said feeding plane, means for maintaining the front or outermost surface of the stack in a flat position coinciding with the feeding plane of the feeder apparatus including a movable supporting backing plate of relatively broad expanse and engaging a thicker portion of the stack, movable auxiliary supporting means structurally separate from the backing plate and displacing the thinner side of the stack in a direction toward the feeding plane by an amount corresponding to the difference in thickness between the sides of the stack, and means for moving said backing plate and said auxiliary supporting means toward said feeding position at different rates related to the different thicknesses of the sides of the stack, thereby to maintain the displacement of the thinner side of stack by said auxiliary support means relative to said plate approximately equal to the difference in the thickness of the sides of the stack as sheets are successively withdrawn therefrom.

4. In a form handling device for presenting the front or outermost form of a stack of paper sheets, cards and the like to a flat feeding position in a form feeding apparatus in which said forms are fed one at a time from said stack along a predetermined path, each of said forms being of greater thickness along one side than at the opposite side thereof, the combination of a supporting backing plate movable in a direction to present the outermost form of said feeding apparatus, auxiliary supporting means movable relative to and positioned in advance of said plate and adapted to engage the thinner portion of said stack of forms with the thicker portion of the stack engaging said plate, means for moving said plate at a uniform rate and means for moving said auxiliary supporting means at a different rate whereby the positional difference therebetween diminishes as the plate is advanced until the plate and auxiliary supporting means are at substantially the same position, said last named means including a differential compensating linkage having a portion pivotally coupled to said backing plate, another portion fixed against movement in the direction of movement of said backing plate, and an intermediate portion contacting said auxiliary support means.

5. In a form handling device for presenting the front or outermost form of a stack of paper sheets, cards and the like to a flat feeding position in a form feeding apparatus in which said forms are fed one at a time from said stack along a predetermined path, each of said forms being of greater thickness along one side than at the opposite side thereof, the combination of a supporting backing plate movable in a direction to present the outermost form to said feeding apparatus, auxiliary supporting means movable relative to and positioned in advance of said plate and adapted to engage the thinner portion of said stack of forms with the thicker portion of the stack engaging said plate, means for moving said plate at a uniform rate and means for moving said auxiliary supporting means at a different rate whereby the positional difference therebetween diminishes as the plate is advanced until the plate and auxiliary supporting means are at substantially the same position, said last named means including a differential compensating linkage having a portion pivotally coupled to said backing plate, another portion fixed against movement in the direction of movement of said backing plate, and an intermediate portion contacting said auxiliary support means, and means for disengaging said intermediate portion from said auxiliary supporting means.

6. In a form handling device for presenting the front or outermost form of a stack of paper sheets, cards and the like to a flat feeding position in a form feeding apparatus in which said forms are fed one at a time from said stack along a predetermined path, each of said forms being of greater thickness along one side than at the opposite side thereof, the combination of a supporting backing plate movable in a direction to present the outermost form to said feeding apparatus, auxiliary supporting means movable relative to and positioned in advance of said plate and adapted to engage the thinner portion of said stack of forms with the thicker portion of the stack engaging said plate, means for moving said plate at a uniform rate and means for moving said auxiliary supporting means at a different rate whereby the positional difference therebetween diminishes as the plate is advanced until the plate and auxiliary supporting means are at substantially the same position, said last named means including a lever arm having an end portion pivotally coupled to said backing plate and another portion fixed against movement in the direction of movement of said backing plate and a lowering arm pivotally mounted at one end to said lever and having a projecting contact on its other end contacting said auxiliary support means.

7. The combination in accordance with claim 6 wherein said lowering arm includes means for latching it in an active position to said lever where the projecting contact thereon contacts said auxiliary support means, means for raising said lowering arm into a latching engaged position with said lever, and means for disengaging said lowering arm from said lever.

References Cited in the file of this patent

FOREIGN PATENTS

| 51,894 | Denmark | July 6, 1936 |
| 1,073,763 | France | Sept. 29, 1954 |